United States Patent
Chu et al.

(10) Patent No.: US 10,383,091 B2
(45) Date of Patent: Aug. 13, 2019

(54) TRANSMISSION OPPORTUNITY OWNERSHIP TRANSFER AND EXTENSION IN A WIRELESS LOCAL AREA NETWORK (WLAN)

(71) Applicant: Marvell World Trade Ltd., St. Michael (BB)

(72) Inventors: Liwen Chu, San Ramon, CA (US); Lei Wang, San Diego, CA (US); Hongyuan Zhang, Fremont, CA (US); Jinjing Jiang, San Jose, CA (US); Hui-Ling Lou, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 171 days.

(21) Appl. No.: 15/144,577

(22) Filed: May 2, 2016

(65) Prior Publication Data
US 2016/0323849 A1   Nov. 3, 2016

Related U.S. Application Data

(60) Provisional application No. 62/156,097, filed on May 1, 2015, provisional application No. 62/323,261, filed on Apr. 15, 2016.

(51) Int. Cl.
| | | |
|---|---|---|
| H04W 72/04 | (2009.01) | |
| H04L 5/00 | (2006.01) | |
| H04W 74/08 | (2009.01) | |
| H04W 84/12 | (2009.01) | |
| H04W 74/00 | (2009.01) | |

(52) U.S. Cl.
CPC ........... *H04W 72/04* (2013.01); *H04L 5/0007* (2013.01); *H04W 74/0816* (2013.01); *H04W 72/0446* (2013.01); *H04W 72/0453* (2013.01); *H04W 74/004* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 7,944,897 B2 * | 5/2011 | Shao | H04W 74/0833 370/322 |
| 8,886,755 B1 | 11/2014 | Liu et al. | |
| 9,325,618 B1 * | 4/2016 | Yonge, III | H04L 47/10 |

(Continued)

OTHER PUBLICATIONS

Stacey, "Specification Framework for TGax," doc. IEEE 802.11-15/0132r12, vol. 802.11ax, No. 12, 38 pages (Dec. 1, 2015).

(Continued)

*Primary Examiner* — Steve R Young

(57) ABSTRACT

A transmission opportunity (TXOP) owner transfer request is received at a first communication device from a second communication device. The TXOP transfer request indicates that the second communication device is requesting to transfer ownership of a first TXOP to the first communication device, wherein the first TXOP is owned by the second communication device. In response to receiving the TXOP owner transfer request, the first communication device initiates a second TXOP which is owned by the first communication device.

18 Claims, 10 Drawing Sheets

(56) References Cited

U.S. PATENT DOCUMENTS

| | | | | |
|---|---|---|---|---|
| 2007/0064720 | A1* | 3/2007 | Sterenson | H04L 12/413 370/445 |
| 2012/0113952 | A1 | 5/2012 | Kneckt et al. | |
| 2013/0089036 | A1 | 4/2013 | Cho et al. | |
| 2013/0229996 | A1 | 9/2013 | Wang et al. | |
| 2015/0071051 | A1 | 3/2015 | Zhu et al. | |
| 2015/0131517 | A1 | 5/2015 | Chu et al. | |
| 2015/0146654 | A1 | 5/2015 | Chu et al. | |
| 2015/0236822 | A1* | 8/2015 | Pirskanen | H04L 1/1812 370/329 |
| 2016/0028466 | A1* | 1/2016 | Han | H04L 12/28 370/315 |
| 2016/0295580 | A1* | 10/2016 | Katar | H04W 24/08 |
| 2016/0345362 | A1* | 11/2016 | Lee | H04W 74/0816 |
| 2017/0105208 | A1* | 4/2017 | Hedayat | H04W 72/048 |

OTHER PUBLICATIONS

International Search Report and Written Opinion in International Application No. PCT/US2016/030440, dated Sep. 9, 2016 (12 pages).

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).

IEEE Std 802.11ac/D7.0 "Draft Standard for Information Technology-Telecommunications and information exchange between systems-Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).

IEEE P802.11ax™/D0.1, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for high efficiency in frequency bands between 1 GHz and 6 GHz," IEEE Computer Society, 221 pages (Mar. 2016).

Seok et al., "HEW PPDU Format for Supporting MIMO-OFDMA," IEEE 802.11-14/1210r0, 16 pages, (Sep. 14, 2014).

Tandai et al., "An Efficient Uplink Multiuser MIMO Protocol in IEEE 802.11 WLANs," IEEE 20th International Symposium on Personal, Indoor and Mobile Radio Communications (PIMRC 2009), pp. 1153-1157 (Sep. 13, 2009).

International Preliminary Report on Patentability in International Patent Application No. PCT/US2016/030440, dated Nov. 16, 2017 (9 pages).

Communication Pursuant to Article 94(3) EPC in European Patent Application No. 16730541.6, dated Feb. 26, 2019 (4 pages).

* cited by examiner

TRANSMISSION OPPORTUNITY OWNERSHIP TRANSFER AND EXTENSION IN A WIRELESS LOCAL AREA NETWORK (WLAN)

CROSS-REFERENCES TO RELATED APPLICATIONS

This disclosure claims the benefit of U.S. Provisional Patent Application No. 62/156,097, filed on May 1, 2015, and 62/323,261, filed Apr. 15, 2016, both entitled "TXOP Sharing and Extension," the disclosures of which are hereby expressly incorporated herein by reference in their entireties.

FIELD OF THE DISCLOSURE

The present disclosure relates generally to communication networks and, more particularly, to wireless local area networks that utilize orthogonal frequency division multiplexing (OFDM).

BACKGROUND

When operating in an infrastructure mode, wireless local area networks (WLANs) typically include an access point (AP) and one or more client stations. WLANs have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.1 lac Standard specifies a single-user peak throughput in the gigabits per second (Gbps) range. Future standards promise to provide even greater throughputs, such as throughputs in the tens of Gbps range.

SUMMARY

In an embodiment, a method includes receiving, at a first communication device from a second communication device, a transmission opportunity (TXOP) owner transfer request that indicates that the second communication device is requesting to transfer ownership of a first TXOP to the first communication device, wherein the first TXOP is owned by the second communication device. The method also includes, in response to receiving the TXOP owner transfer request, initiating a second TXOP by the first communication device, wherein the second TXOP is owned by the first communication device.

In another embodiment, a first communication device comprises a network interface device having one or more integrated circuits configured to receive a transmission opportunity (TXOP) owner transfer request that indicates that a second communication device is requesting to transfer ownership of a first TXOP to the first communication device, wherein the first TXOP is owned by the second communication device. The one or more integrated circuits are also configured to, in response to receiving the TXOP owner transfer request, initiate a second TXOP, wherein the second TXOP is owned by the first communication device.

DETAILED DESCRIPTION

In embodiments described below, a first communication device, such as an access point (AP) of a wireless local area network (WLAN), receives, from a second communication device, such as a client station, a request to transfer a first transmission opportunity (TXOP) of the second communication device to the first communication device. In an embodiment, a TXOP is a bounded time interval reserved for a communication device in a network during which the communication device can send as many frames as possible (as long as the duration of the transmissions does not extend beyond a PPDU length defined by the second communication device and beyond the TXOP). In an embodiment, other communication devices are generally not permitted to transmit in the TXOP unless the communication device to which the TXOP is assigned specifically permits the other communication device to transmit or unless the other communication device is acknowledging a transmission of the communication device to which the TXOP is assigned. In response to receiving the request to transfer ownership of the first TXOP of the second communication devices to the first communication device, the first communication device assumes ownership of the first TXOP of the second communication device, in an embodiment. The first communication device then initiates a second TXOP using the first TXOP transferred from the second communication device to the first communication device, in an embodiment. In an embodiment, the first communication device uses the first TXOP transferred from the second communication device to the first communication device to initiate the second TXOP without first performing a backoff procedure to acquire a TXOP, in an embodiment. In some embodiments and/or scenarios, the second TXOP utilizes parameters (e.g., bandwidth, duration, access class, etc.) of the first TXOP. In other embodiments and/or scenarios, the first communication device modifies one of more parameters (e.g., bandwidth, duration, access class, etc.) of the first TXOP, and initiates the second TXOP using the modified one or more parameters of the first TXOP. Thus, as just an example, a bandwidth of the second TXOP is the same as or is different from (e.g., narrower than or wider than) a bandwidth of the first TXOP, in various embodiments and/or scenarios.

Figure 1:
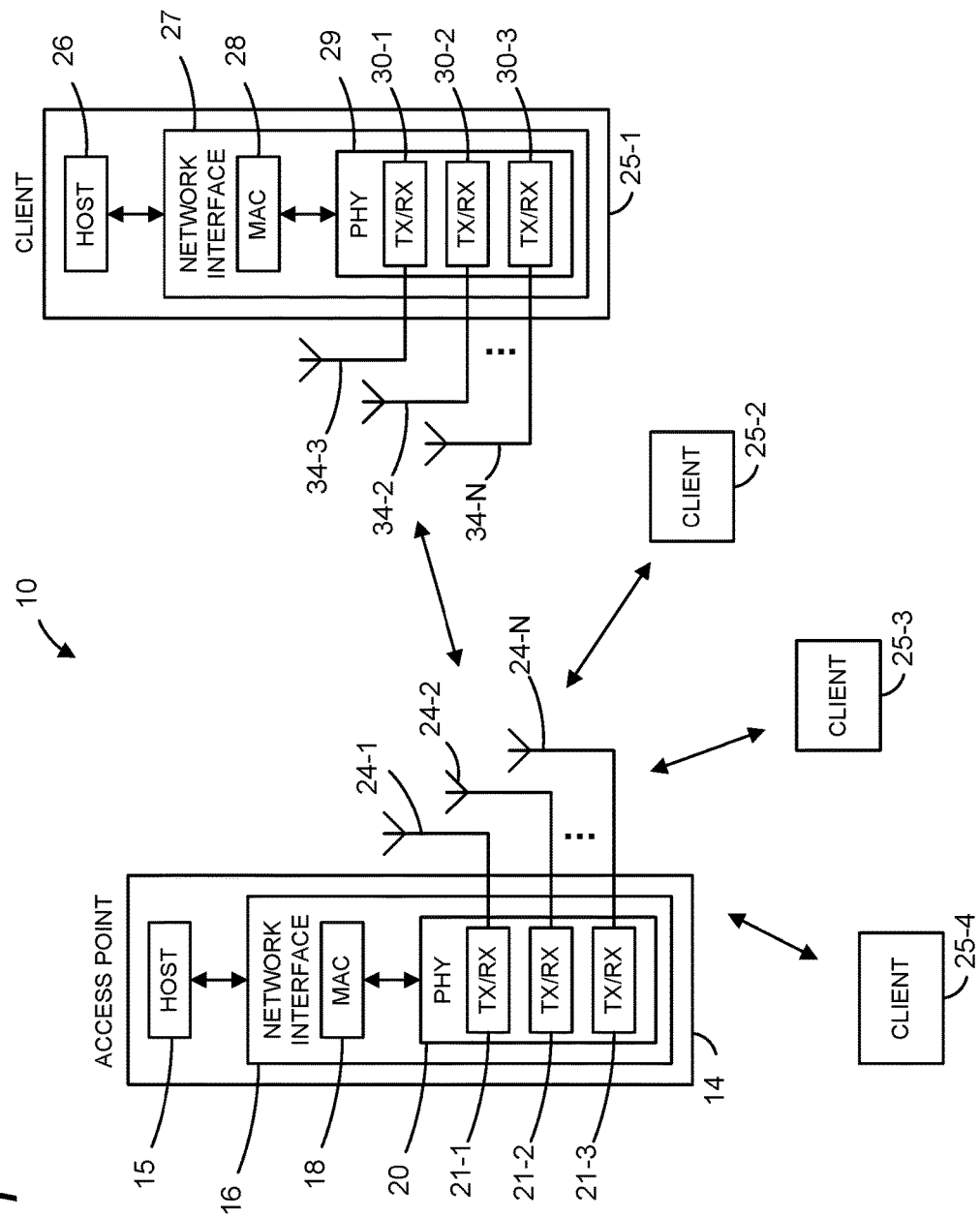
FIG. 1 is a block diagram of an example wireless local area network (WLAN), according to an embodiment.

FIG. 1 is a block diagram of an example wireless local area network (WLAN) 10, according to an embodiment. An AP 14 includes a host processor 15 coupled to a network interface 16. In an embodiment, the network interface 16 includes one or more integrate circuits (ICs) configured to operate as discussed below. The network interface 16 includes a medium access control (MAC) processor 18 and a physical layer (PHY) processor 20. The PHY processor 20 includes a plurality of transceivers 21, and the transceivers 21 are coupled to a plurality of antennas 24. Although three transceivers 21 and three antennas 24 are illustrated in FIG. 1, the AP 14 includes other suitable numbers (e.g., 1, 2, 4, 5, etc.) of transceivers 21 and antennas 24 in other embodiments. In some embodiments, the AP 14 includes a higher number of antennas 24 than transceivers 21, and antenna switching techniques are utilized. In an embodiment, the MAC processor 18 is implemented on at least a first IC, and the PHY processor 20 is implemented on at least a second IC. In an embodiment, at least a portion of the MAC processor 18 and at least a portion of the PHY processor 20 are implemented on a single IC.

In an embodiment, the PHY processor 20 scrambles an MPDU (e.g., a PHY service data unit) based on a scramble seed.

In various embodiments, the MAC processor 18 and the PHY processor 20 are configured to operate according to a first communication protocol (e.g., a High Efficiency, HE, or 802.11ax communication protocol). In some embodiments, the MAC processor 18 and the PHY processor 20 are also configured to operate according to a second communication protocol (e.g., according to the IEEE 802.11ac Standard). In yet another embodiment, the MAC processor 18 and the PHY processor 20 are additionally configured to operate according to the second communication protocol, a third communication protocol, and/or a fourth communication protocol (e.g., according to the IEEE 802.11a Standard and/or the IEEE 802.11n Standard).

The WLAN 10 includes a plurality of client stations 25. Although four client stations 25 are illustrated in FIG. 1, the WLAN 10 includes other suitable numbers (e.g., 1, 2, 3, 5, 6, etc.) of client stations 25 in various scenarios and embodiments. At least one of the client stations 25 (e.g., client station 25-1) is configured to operate at least according to the first communication protocol. In some embodiments, at least one of the client stations 25 is not configured to operate according to the first communication protocol but is configured to operate according to at least one of the second communication protocol, the third communication protocol, and/or the fourth communication protocol (referred to herein as a "legacy client station").

The client station 25-1 includes a host processor 26 coupled to a network interface 27. In an embodiment, the network interface 27 includes one or more ICs configured to operate as discussed below. The network interface 27 includes a MAC processor 28 and a PHY processor 29. The PHY processor 29 includes a plurality of transceivers 30, and the transceivers 30 are coupled to a plurality of antennas 34. Although three transceivers 30 and three antennas 34 are illustrated in FIG. 1, the client station 25-1 includes other suitable numbers (e.g., 1, 2, 4, 5, etc.) of transceivers 30 and antennas 34 in other embodiments. In some embodiments, the client station 25-1 includes a higher number of antennas 34 than transceivers 30, and antenna switching techniques are utilized. In an embodiment, the MAC processor 28 is implemented on at least a first IC, and the PHY processor 29 is implemented on at least a second IC. In an embodiment, at least a portion of the MAC processor 28 and at least a portion of the PHY processor 29 are implemented on a single IC.

According to an embodiment, the client station 25-4 is a legacy client station, i.e., the client station 25-4 is not enabled to receive and fully decode a data unit that is transmitted by the AP 14 or another client station 25 according to the first communication protocol. Similarly, according to an embodiment, the legacy client station 25-4 is not enabled to transmit data units according to the first communication protocol. On the other hand, the legacy client station 25-4 is enabled to receive and fully decode and transmit data units according to the second communication protocol, the third communication protocol, and/or the fourth communication protocol.

In an embodiment, one or both of the client stations 25-2 and 25-3, has a structure that is the same as or similar to the client station 25-1. In an embodiment, the client station 25-4 has a structure similar to the client station 25-1. In these embodiments, the client stations 25 structured the same as or similar to the client station 25-1 have the same or a different number of transceivers and antennas. For example, the client station 25-2 has only two transceivers and two antennas (not shown), according to an embodiment.

In various embodiments, the MAC processor 18 and the PHY processor 20 of the AP 14 are configured to generate data units conforming to the first communication protocol and having formats described herein. In an embodiment, the MAC processor 18 is configured to implement MAC layer functions, including MAC layer functions of the first communication protocol. In an embodiment, the PHY processor 20 is configured to implement PHY functions, including PHY functions of the first communication protocol. For example, in an embodiment, the MAC processor 18 is configured to generate MAC layer data units such as MPDUs, MAC control frames, etc., and provide the MAC layer data units to the PHY processor 20. In an embodiment, the PHY processor 20 is configured to receive MAC layer data units from the MAC processor 18 and encapsulate the MAC layer data units to generate PHY data units such as PHY protocol data units (PPDUs) for transmission via the antennas 24. Similarly, in an embodiment, the PHY processor 20 is configured to receive PHY data units that were received via the antennas 24, and extract MAC layer data units encapsulated within the PHY data units. In an embodiment, the PHY processor 20 provides the extracted MAC layer data units to the MAC processor 18, which processes the MAC layer data units.

The transceiver(s) 21 is/are configured to transmit the generated data units via the antenna(s) 24. Similarly, the transceiver(s) 21 is/are configured to receive data units via the antenna(s) 24. The MAC processor 18 and the PHY processor 20 of the AP 14 are configured to process received data units conforming to the first communication protocol and having formats described hereinafter and to determine that such data units conform to the first communication protocol, according to various embodiments.

In various embodiments, the MAC processor 28 and the PHY processor 29 of the client device 25-1 are configured to generate data units conforming to the first communication protocol and having formats described herein. In an embodiment, the MAC processor 28 is configured to implement MAC layer functions, including MAC layer functions of the first communication protocol. In an embodiment, the PHY processor 29 is configured to implement PHY functions, including PHY functions of the first communication protocol. For example, in an embodiment, the MAC processor 28 is configured to generate MAC layer data units such as MPDUs, MAC control frames, etc., and provide the MAC layer data units to the PHY processor 29. In an embodiment, the PHY processor 29 is configured to receive MAC layer data units from the MAC processor 28 and encapsulate the MAC layer data units to generate PHY data units such as PPDUs for transmission via the antennas 34. Similarly, in an embodiment, the PHY processor 29 is configured to receive PHY data units that were received via the antennas 34, and extract MAC layer data units encapsulated within the PHY data units. In an embodiment, the PHY processor 29 provides the extracted MAC layer data units to the MAC processor 28, which processes the MAC layer data units.

The transceiver(s) 30 is/are configured to transmit the generated data units via the antenna(s) 34. Similarly, the transceiver(s) 30 is/are configured to receive data units via the antenna(s) 34. The MAC processor 28 and the PHY processor 29 of the client device 25-1 are configured to process received data units conforming to the first communication protocol and having formats described hereinafter and to determine that such data units conform to the first communication protocol, according to various embodiments.

In various embodiments and scenarios described below with respect to FIGS. 2-9, a first communication device (e.g., an AP) receives a request from a second communication device (e.g., a client station) requesting that ownership of a TXOP of the second communication device ("original TXOP") be transferred to the first communication device. The first communication device accepts the request, or rejects the request, from the second communication device, in some of the embodiments. If the first communication device accepts the request, then the first communication device becomes the owner of the TXOP, in an embodiment. The first communication device then initiates a new TXOP ("transferred TXOP") now owned by the first communication device. The transferred TXOP utilizes the same TXOP parameters (e.g., bandwidth, access class, duration, etc.) as the original TXOP, or utilizes TXOP parameters that are different from the original TXOP, in various embodiments. If the first communication device does not accept the request received from the second communication device, then the second communication device remains the owner of the original TXOP, in an embodiment. The second communication device then continues using the original TXOP, for example to transmit data (e.g., additional data) to the first communication device, in some embodiments.

Figure 2:
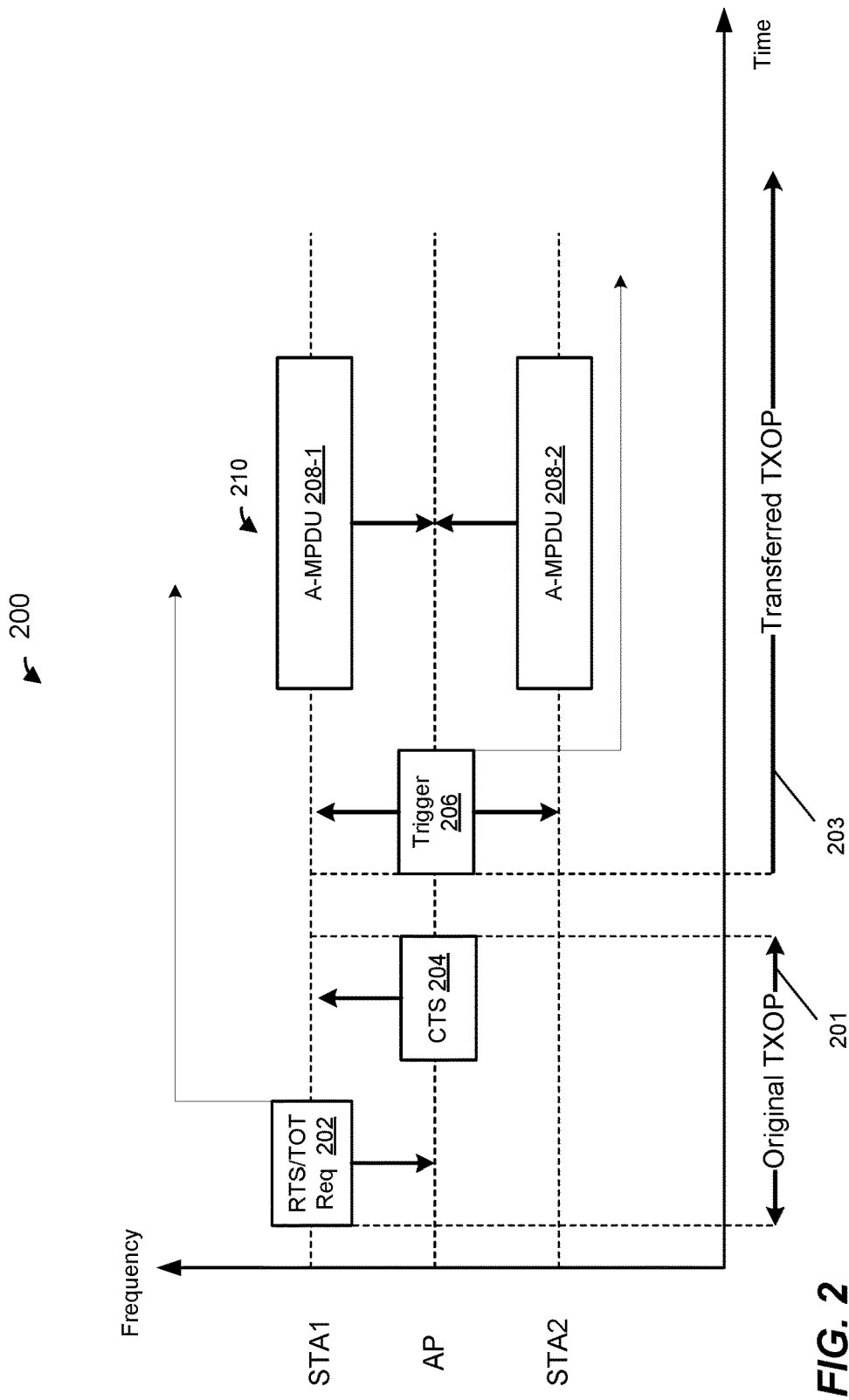
FIG. 2 is a diagram of an example transmission sequence in a WLAN, according to an embodiment.

FIG. 2 is a diagram of an example transmission sequence 200 in a WLAN, such as the WLAN 10 of FIG. 1, according to an embodiment. In an embodiment, STA1 (e.g., the client station 25-1) obtains (e.g., acquires) a transmit opportunity (TXOP) 201. After obtaining the TXOP 201, STA1 transfers ownership of the TXOP 201 to an AP (e.g., the AP 14), for example so that the AP can trigger a group of stations to transmit a multi-user (MU) uplink transmission to the AP, in an embodiment. Once ownership of the TXOP 201 is transferred from STA1 to the AP, the AP initiates a new, transferred, TXOP 203 now owned by the AP. The AP initiates the new TXOP 203 without performing a backoff procedure and/or without performing clear channel assessment to acquire a TXOP, in an embodiment. The TXOP 201 owned by STA1 is sometimes referred to herein as "original TXOP," and the TXOP 203 owned by the AP is sometimes referred to herein as "transferred TXOP." In some embodiments, the AP modifies one or more parameters (e.g., bandwidth, duration, access class, etc.) of the original TXOP, and the modified one or more parameters are then used for the transferred TXOP. In some other embodiments, AP does not modify parameters of the original TXOP, and the parameters of the original TXOP are used with the transferred TXOP.

In an embodiment, to transfer ownership of the TXOP 201 to the AP, STA1 initiates a request to send (RTS)/clear to send (CTS) frame exchange with the AP. Referring still to FIG. 2, in an embodiment, after obtaining TXOP 201, STA1 transmits a request to send (RTS)/TXOP owner transfer (TOT) request (RTS/TOT) frame 202 to the AP. The RTS/TOT frame 202 includes a TOT request to transfer ownership of the TXOP 201, obtained by STA1, to the AP, in an embodiment. In an embodiment, the TOT request is included in a control frame, such as a TXOP owner transfer request control frame, that is aggregated with an RTS frame in the RTS/TOT frame 202. In another embodiment, the TOT request is included in an HE control field in a MAC header of the RTS/TOT frame 202. In an embodiment, the MAC header of the RTS/TOT frame 202 includes an indication (e.g., a one bit indication) that indicates whether or not an HE control field is included in the MAC header. For example, an indication of whether or not an HE control field is included in the MAC header in included at a bit location in the first two bytes of the MAC header, in an embodiment. In another embodiment, an indication of whether or not an HE control field is included in another suitable location in the MAC header.

In an embodiment, STA1 sets network allocation vector (NAV) in the RTS/TOT frame 202 to a value corresponding to remainder of TXOP duration, reserved for TXOP 201 by STA1, after the end of RTS/TOT frame 302. In an embodiment, STA1 reserves sufficient duration for TXOP 201 such that the remainder of the TXOP duration after the end of RTS/TOT frame 302 includes at least (i) a duration of transmission of a CTS frame from the AP to STA1 and (ii) a duration of a predetermined time interval, such as a time interval corresponding to a short inter-fame space (SIFS), between reception of the RTS/TOT frame 202 and transmission of the CTS frame by the AP.

The AP receives the RTS/TOT frame 202 and determines, based on the RTS/TOT frame 202, that STA1 is requesting to transfer ownership of a TXOP obtained by the STA1 to the AP, in an embodiment. In response to receiving RTS/TOT frame 202, the AP transmits a CTS frame 204 to STA1. After the CTS frame 204 is transmitted, the original TXOP 201 that was owned by STA1 ends, and the transferred TXOP 203 that is now owned by the AP begins, in an embodiment.

After TXOP is transferred to the AP, the AP transmits a trigger frame 206 to a group of client stations that includes STA1 and at least one additional station STA2 (e.g., the client stations 25-2). The trigger frame 206 initiates the transferred TXOP 203, in an embodiment. The trigger frame 206 triggers uplink transmissions by STA1, STA2 to the AP, in an embodiment. In an embodiment, the trigger frame 206 triggers an uplink multi-user (MU) transmission in which STA1, STA2 transmit independent data streams (e.g., respective data units) simultaneously transmit to the AP using respective different spatial streams. In another embodiment, the trigger frame 206 triggers an uplink orthogonal frequency division multiple access (OFDMA) transmission in which STA1, STA2 transmit independent data streams (e.g., respective data units) simultaneously transmit to the AP using respective different spatial streams. In an embodiment, the trigger frame 206 includes indications of respective spatial streams and/or respective frequency portions allocated to STA1, STA2 for uplink transmission to the AP. In some embodiments, the trigger frame 206 additionally or alternatively indicates other transmission parameters to be used by STA1, STA2 for the uplink transmission to the AP. For example, the trigger frame 206 includes an indication of a maximum length or duration of the uplink transmission, respective indications of modulations and coding schemes (MCS) to be used for the uplink transmissions to the AP, etc. In an embodiment AP sets NAV in the trigger frame 206 to a value corresponding to remainder of TXOP duration, reserved for the transferred TXOP 203 by the AP, after the end of the trigger frame 206.

The transferred TXOP 203 utilizes the same TXOP parameters (e.g., bandwidth, access class, duration, etc.) as the original TXOP 201, or utilizes TXOP parameters that are different from the original TXOP 201, in various embodiments. For example, in an embodiment and/or scenario, the AP initiates the transferred TXOP 203 with the same TXOP parameters as those that were used in the original TXOP 201. In another embodiment and/or scenario, the AP modifies one or more TXOP parameters of the original TXOP 201, and initiates the transferred TXOP 203 with the modified TXOP parameters. For example, the AP modifies the duration of the original TXOP 201 in one embodiment and/or scenario. The AP does not modify the duration of the original TXOP 201, in another embodiment and/or scenario. In an embodiment and/or scenario in which the AP does not modify the duration of the original TXOP 201, the duration of the transferred TXOP 203 corresponds to the remainder of the duration of the original TXOP 201 after the RTS/CTS frame exchange that was used to transfer to the original TXOP 201. On the other hand, in an embodiment and/or scenario in which the AP modifies the duration of the original TXOP 201, the duration of the transferred TXOP 203 is different from the remainder of the duration of the original TXOP 201 after the RTS/CTS frame exchange that was used to transfer to the original TXOP 201. For example, the duration of the transferred TXOP 203 is greater than the remainder of the duration of the original TXOP 201 after the RTS/CTS frame exchange that was used to transfer to the original TXOP 201, in an embodiment. Thus, the AP "extends" the duration of the original TXOP 201, and utilizes extended duration for the transferred TXOP 203, in this embodiment.

As another example, the AP modifies the bandwidth of the original TXOP 201 in one embodiment and/or scenario, and does not modify the bandwidth of the original TXOP 201 in another embodiment and/or scenario. For example, in on embodiment and scenario, whereas the bandwidth of the original TXOP 201 is 40 MHz, the bandwidth of the transferred TXOP 203 is 80 MHz or 160 MHz. As just another example, in another embodiment and scenario, whereas the bandwidth of the original TXOP 201 is 80 MHz, the bandwidth of the transferred TXOP 203 is 40 MHz or 20 MHz. In an embodiment, if the bandwidth of the transferred TXOP 203 is the same as or narrower than the bandwidth of the original TXOP 201, then the AP transmits a data unit (e.g., the trigger frame 206) that initiates the transferred TXOP 203, upon expiration of a relatively shorter time interval after transmitting a data unit (e.g., the CTS frame 204) that ends the original TXOP 201, as compared to a relatively longer time interval if the bandwidth of the transferred TXOP 203 is wider than the bandwidth of the original TXOP 201. As just an example, if the bandwidth of the transferred TXOP 203 is the same as or narrower than the bandwidth of the original TXOP 201, then the AP transmits the trigger frame 206 upon expiration of a time interval corresponding to a short inter-frame space (SIFS) after transmitting the CTS frame 204. On the other hand, if the AP wishes to utilize a wider bandwidth for the transferred TXOP 203 as compared to the bandwidth of the original TXOP 201, then the AP transmits the trigger frame 206 upon expiration of a time interval corresponding to a point of point coordination function (PCF) inter-frame space (PIFS) after transmitting the CTS frame 204, where PIFS is greater than SIFS, in an embodiment. The AP utilizes longer time interval to determine whether the wider channel is available (e.g., idle) for use in the transferred TXOP 203, in an embodiment.

As another example, the AP modifies access class used in the original TXOP 201, and the modified access class is used with the transferred TXOP 203, in an embodiment. For example, the AP selects any suitable access class for each station (e.g., the STA1, STA2) that the AP designates as a responder in the transferred TXOP 203, in an embodiment. In another embodiment, the AP does not modify access class used in the original TXOP 201. In this embodiment, the access class used in the original TXOP 201 is used for the transferred TXOP 203.

With continued reference to FIG. 2, in response to receiving the trigger frame 206, STA1 and STA2 transmit data units 208-1, 208-2 as parts of an uplink transmission 210 to the AP. In an embodiment, the client stations STA1, STA2 transmit the respective data units, such as aggregated MDPUs (A-MPDUs), 208-1, 208-2 to the AP simultaneously using respective different spatial streams and/or using respective different frequency portions, in various embodiments. In an embodiment, STA1 and STA2 use parameters, such as one or more of (i) spatial streams allocated to the STA1, STA2, (ii) frequency portions allocated to the STA1, STA2, (iii) duration of uplink transmission, (iv) MCS, etc. indicated in the trigger frame 206 for transmission of the uplink data units 208-1, 208-2.

Figure 3:
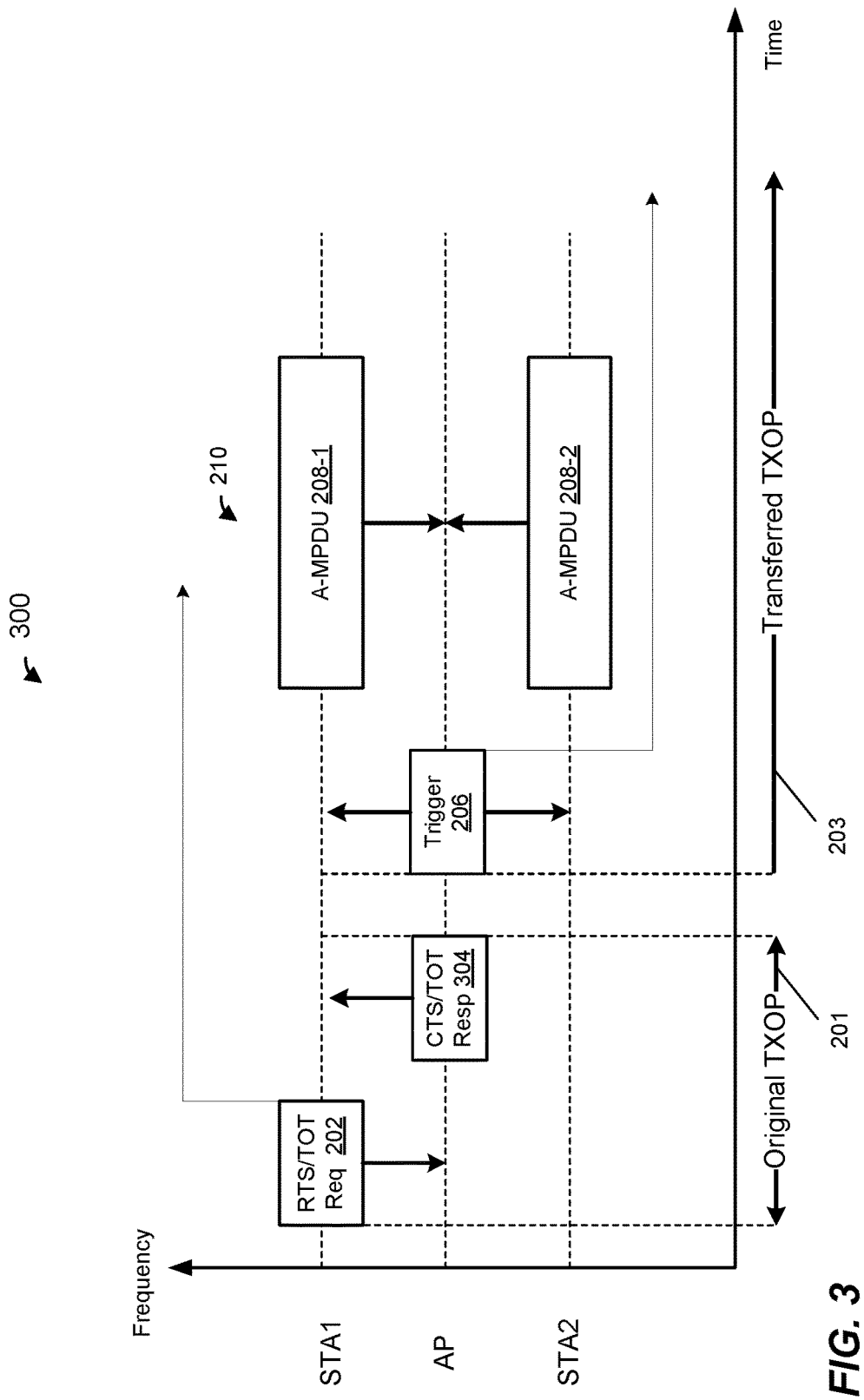
FIG. 3 is a diagram of another example transmission sequence in a WLAN, according to another embodiment.

FIG. 3 is a diagram of an example transmission sequence 300 in a WLAN, such as the WLAN 10 of FIG. 1, according to an embodiment. The transmission sequence 300 is generally the same as the transmission sequence 200 of FIG. 2, except that the CTS frame 204 in the transmission sequence 200 is replaced with a CTS/TOT frame 304 in the transmission sequence 300. The CTS/TOT frame 304 includes a response to a TOT request in the RTS/TOT request frame 202, in an embodiment. In an embodiment, the TOT response is included in a control frame, such as a TXOP owner transfer response control frame, that is aggregated with a CTS frame in the CTS/TOT frame 304. In another embodiment, the TOT request is included in an HE control field in a MAC header of the CTS/TOT frame 304. In an embodiment, the MAC header of the CTS/TOT frame 304 includes an indication (e.g., a one bit indication) that indicates whether or not an HE control field is included in the MAC header.

In an embodiment, the TOT response in the CTS/TOT frame 304 allows the AP to either accept the TOT request from STA1 or reject the TOT request from STA1. For example, the AP may be unable to accept the TOT transfer request from STA1 because of busy medium of the AP, in an embodiment. In an embodiment, the TOT response in the CTS/TOT frame 304 includes an indication to indicate one of (i) that the TOT request from STA1 is accepted by the AP or (ii) that the TOT request is rejected by the AP. In another embodiment, presence of the TOT response in the CTS/TOT frame 304 indicates that the TOT request is accepted by the AP, and absence of a TOT response in the CTS/TOT frame 304 indicates that the TOT request is rejected by the AP. Accordingly, the AP omits the TOT response from the CTS/TOT frame 304 if the AP wishes to reject the TOT request, in this embodiment. In the scenario illustrated in FIG. 3, the TOT response in the CTS/TOT frame 304 indicates that the AP is accepting the TOT request in the RTS/TOT frame 202. Thus, ownership of the TXOP 201 is transferred from STA1 to the AP, such that the AP becomes the owner and initiates the transferred TXOP 203, as described above with respect to FIG. 2, in an embodiment. For example, the AP initiates the transferred TXOP 203 with parameters that are the same as or different from the original TXOP 201, as described above with respect to FIG. 2, in various embodiments.

Figure 4:
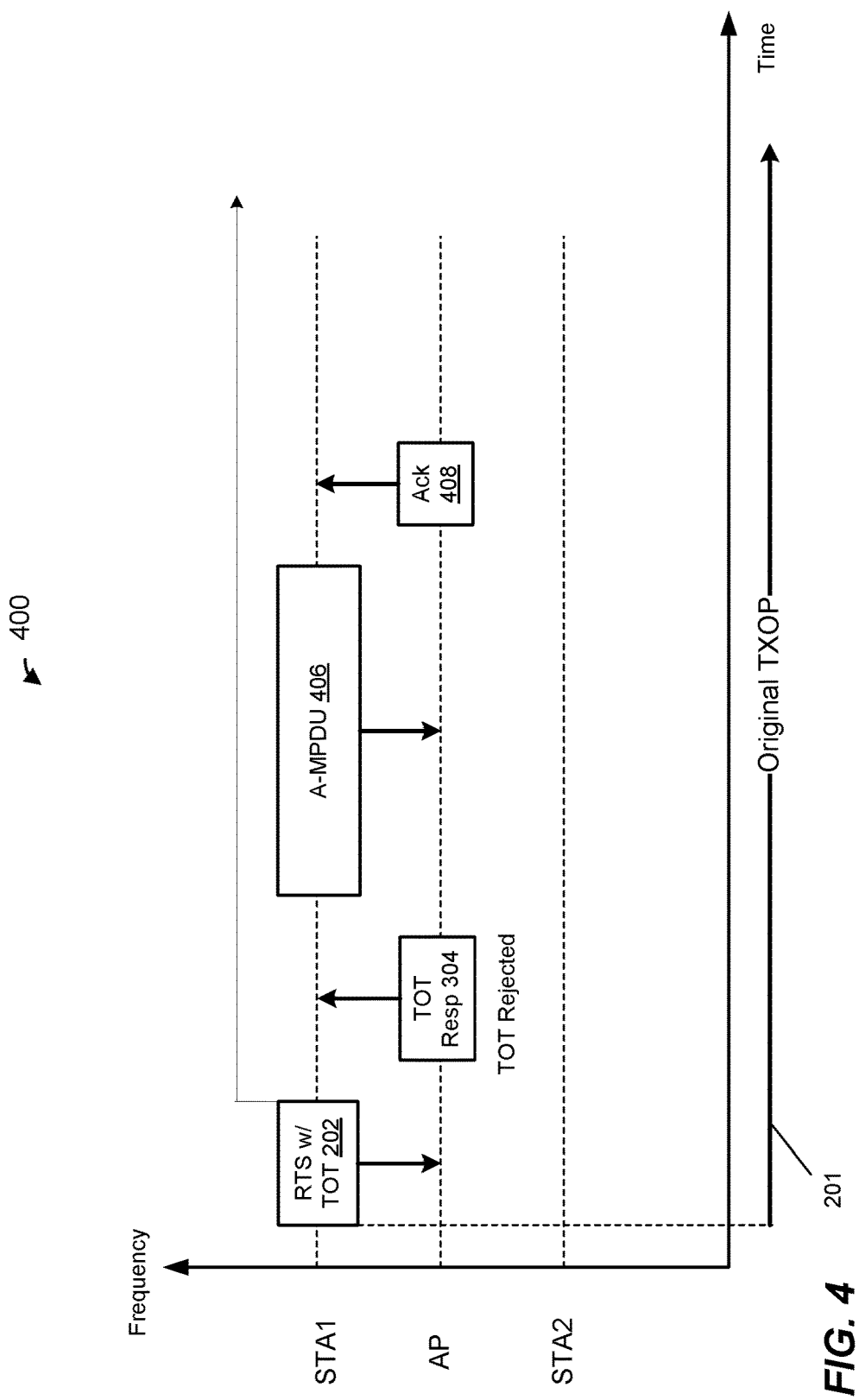
FIG. 4 is a diagram of an example transmission sequence in a WLAN, according to another embodiment.

FIG. 4 is a diagram of an example transmission sequence 400 in a WLAN, such as the WLAN 10 of FIG. 1, according to an embodiment. The transmission sequence 400 is generally the same as the transmission sequence 300 of FIG. 3, except that in the scenario illustrated in FIG. 4, the TOT response in the CTS/TOT frame 304 indicates that the AP is rejecting the TOT request in the RTS/TOT frame 202. For example, the AP is not able to accept TOT request because communication medium of the AP is not idle, in an embodiment. In an embodiment, because the AP has rejected TOT request of STA1, ownership of the original TXOP 201 is not transferred to the AP. Thus, STA1 retains ownership of the original TXOP 201 after transmission of the CTS/TOT frame 304, in an embodiment. Accordingly, in the transmission sequence 400, after receiving the CTS/TOT frame 304 in which the TOT response indicates that the AP has rejected TOT request of STA1, STA1 continues using the original TXOP 201 by transmitting a data unit, such as an A-MPDU, 406 to the AP. In response to receiving the data unit 406 from STA1, the AP transmits an acknowledgement frame 408 to acknowledge reception of the data unit 406. In some embodiments, the acknowledgement frame 406 is a block acknowledgement (BA) frame that includes a block acknowledgement to acknowledge multiple data units that are aggregated in the data unit 406.

Figure 5:
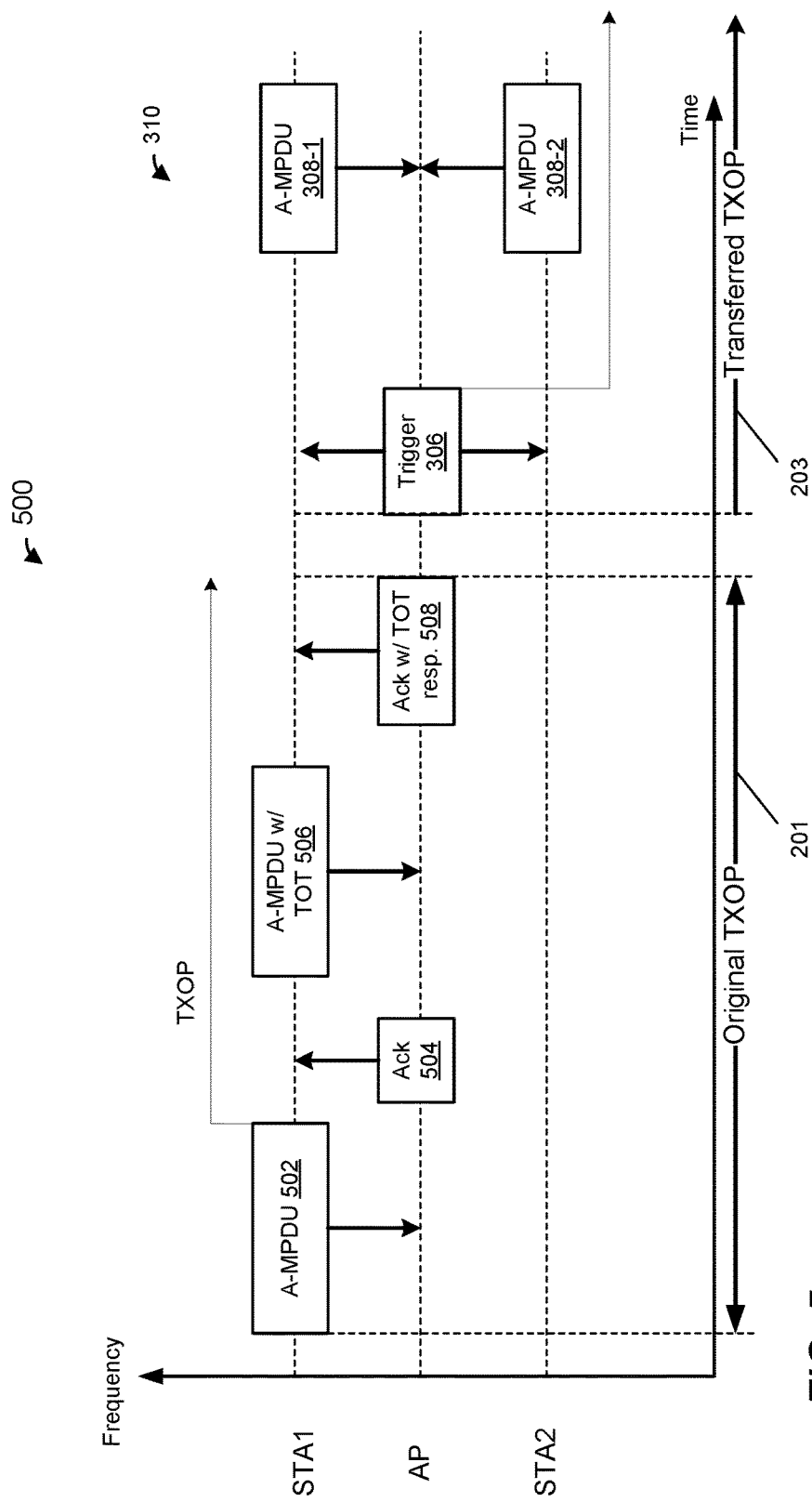
FIG. 5 is a diagram of an example transmission sequence in a WLAN, according to another embodiment.

FIG. 5 is a diagram of an example transmission sequence 500 in a WLAN, such as the WLAN 10 of FIG. 1, according to an embodiment. The transmission sequence 400 is similar to the transmission sequence 300 of FIG. 3, except that in the transmission sequence 500, STA1 transmits one or more data units, such as one or more A-MPDUs, to the AP prior to attempting to transfer the original TXOP 201 to the AP. In an embodiment, the STA1 includes a TOT request in a data unit transmitted by the STA1 to the AP during the TXOP 201. In an embodiment, the AP includes a TOT response in an acknowledgement frame that the AP transmits to the STA1 to acknowledge receipt of the data unit that included the TOT request from STA1. Thus, transmission sequence 500 omits the RTS/TOT frame 204 and the CTS/TOT frame 304 of FIG. 3, in an embodiment.

Referring still to FIG. 5, in an embodiment, after acquiring TXOP 201, STA1 transmits a first data unit, such as an A-MPDU, 502 to the AP. In an embodiment STA1 sets a NAV value in the data unit 502 to a value corresponding to remainder of TXOP duration, reserved for TXOP 201 by STA1, after the end of data unit 502. The AP receives the data unit 502, and acknowledges receipt of the data unit 502 by transmitting an acknowledgement frame (e.g., a BA) 504 to STA1. After receiving the acknowledgement frame 504, STA1 transits a second data unit, such as an A-MPDU, 506 to the AP. The data unit 506 includes a TOT request to transfer TXOP 203 to the AP, in an embodiment. In an embodiment, the TOT request is included in a control frame, such as a TXOP owner transfer request control frame, that is aggregated in the data unit 506. In another embodiment, the TOT request is included in an HE control field in a MAC header of the data unit 506. In an embodiment, the MAC header of the data unit 506 includes an indication (e.g., a one bit indication) that indicates whether or not an HE control field is included in the MAC header.

The AP receives the data unit 506 and determines, based on the data unit 506 that STA1 is requesting to transfer ownership of the TXOP 201 to the AP. In response to receiving the data unit 506, the AP transmits an acknowledgement with TOT response (ACK/TOT) or (BA/TOT) frame 508 to acknowledge receipt of the data unit 506 and to respond to the TOT request in the data unit 506. In an embodiment, the TOT response in the ACK/TOT frame 508 indicates one of (i) that the TOT request from STA1 is accepted by the AP or (ii) that the TOT request is rejected by the AP. In the scenario illustrated in FIG. 3, the TOT response in the ACK/TOT frame 508 indicates that the AP is accepting the TOT request in the data unit 506. Thus, ownership of the TXOP 201 is transferred from STA1 to the AP, such that the AP becomes the owner and initiates the transferred TXOP 203, as described above with respect to FIG. 2, in an embodiment. For example, the AP initiates the transferred TXOP 203 with parameters that are the same as or different from the original TXOP 201, as described above with respect to FIG. 2, in various embodiments. In another scenario, the TOT response in the ACK/TOT frame 508 indicates that the AP is rejecting the TOT request in the data unit 506. In this scenario, STA1 retains ownership of the original TXOP 201, for example as described above with respect to FIG. 4, in an embodiment.

Referring still to FIG. 5, STA1 may not receive the ACK/TOT frame 508 even though the AP has transmitted the ACK/TOT 508, in some situations. For example, STA1 may not receive the ACK/TOT frame 508 due to a collision of the ACK/TOT frame 508 with another simultaneous transmission in the WLAN 10. In this case, according to some communication protocols, STA1 would attempt to retransmit data unit 506 upon expiration of a predetermined time interval after the original transmission of the data unit 506. For example, in a PIFS recovery technique, STA1 would attempt to retransmit the data unit 506 upon expiration of a time interval corresponding to PIFS after the original transmission of the data unit 506. This retransmission of the data unit 506, however, would collide with transmission of the trigger frame 306. In some embodiments, such a recovery technique (e.g., PIFS recovery) is not allowed by the first communication protocol. On the other hand, another suitable recovery technique that would not cause a collision with the trigger frame 306 is allowed by the first communication protocol. For example, a back-off recovery technique is allowed, in an embodiment.

Figure 6:
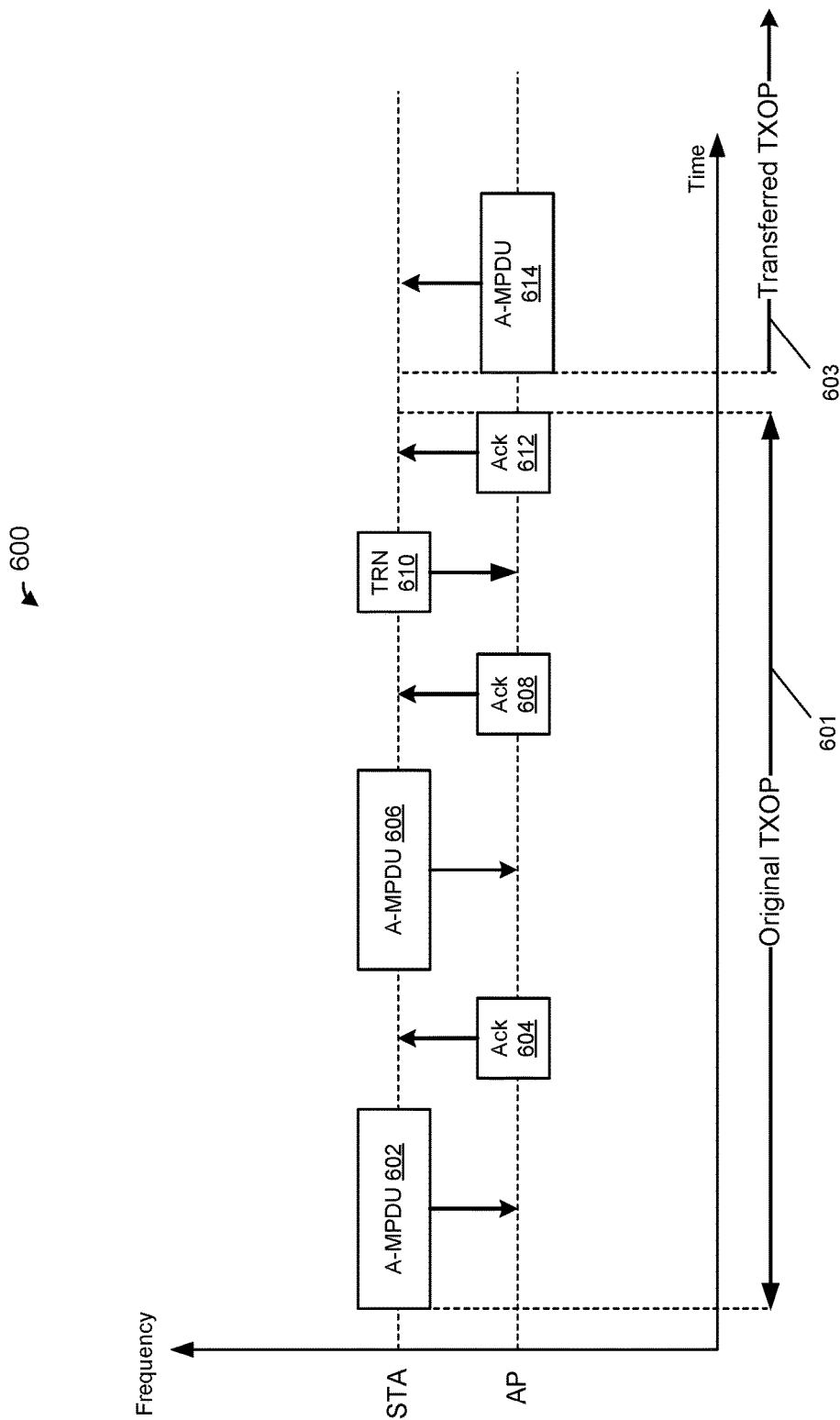
FIG. 6 is a diagram of an example transmission sequence in a WLAN, according to another embodiment.

FIG. 6 is a diagram of an example transmission sequence 600 in a WLAN, such as the WLAN 10 of FIG. 1, according to an embodiment. A client station STA (e.g., the client station 25-1) acquires a TXOP 601 and transmits a first data unit (e.g., an A-MPDU) 602 to an AP (e.g., the AP 14). In response to receiving the data unit 602, the AP transmits an acknowledgement frame (e.g., BA frame) 604 to STA to acknowledge receipt of the data unit 602. STA then transmits a second data unit (e.g., A-MPDU) 606 to the AP, in an embodiment. The AP acknowledges receipt of the second data unit 606 by transmitting an acknowledgement frame (e.g., BA frame) 608, in an embodiment. The acknowledgement frame 608 includes an increased duration indication indicating to STA that the AP is extending the original TXOP 601 of the STA, in an embodiment. In another embodiment, the acknowledgement frame 608 does not include an increased duration indication indicating to STA that the AP is extending the original TXOP 601 of the STA.

In an embodiment, STA receives the acknowledgement frame 608 and determines, based on the duration indication in the acknowledgement frame 608, that the AP has extended the original TXOP 601 of the STA. However, STA wishes to transfer the extended TXOP to the AP, for example because STA does not have any additional data to transmit to the AP, in an embodiment. In another embodiment, STA wishes to transfer the original TXOP 601 to the AP even if the acknowledgement frame 608 does not include an increased duration indication. STA is aware that the AP is configured to support TXOP extension even if the acknowledgement frame 608 does not include an increased duration indication, in an embodiment. For example, the AP has indicated that the AP is configured to support TXOP extension in a control field or a control frame, such as in a high efficiency (HE) capabilities element included in a control frame or a control field, previously transmitted by the AP, in an embodiment.

After receiving the acknowledgement frame 606, the AP transmits a TXOP release notification (TRN) frame 610 to the AP indicating to the AP that STA wishes to transfer ownership of the extended TXOP to the AP, in an embodiment. The TRN frame 610 is a control frame, for example, in an embodiment. In an embodiment, STA transmits TRN frame 610 only if transmission of the TRN frame 610 is within the time duration of the original TXOP 601 of STA. In some embodiments, other stations in a basic service set (BSS) of the WLAN 10 of the STA and AP are a part reset their navigation vector (NAV) counters based on a duration value in the TRN frame 610 so as not to interfere with subsequent transmissions by the AP.

After receiving the TRN frame 610, and acknowledging receipt of the TRN frame 610 to the STA by transmitting an acknowledgement frame (e.g., BA frame) 612 to the STA, the AP initiates a transferred TXOP 603 now owned by the AP, in an embodiment. Because TXOP 603 was transferred to the AP, the AP initiates TXOP 603 without first performing a backoff, in an embodiment. The AP uses the transferred TXOP to transmit one or more data units to the STA, in an embodiment. For example, the AP transmits a data unit (e.g., A-MPDU) 614 to the STA, in an embodiment. For example, the AP transmits the data unit 614 to the STA upon expiration of a predetermined time interval, such as SIFS, after transmission of the acknowledgement frame 612 that acknowledged the TRN frame 610, in an embodiment.

In some embodiments, the transferred TXOP 603 initiated by the AP is initiated with TXOP parameters of the original TXOP 601. In some other embodiments, the AP modifies ones or more parameters (e.g., bandwidth, access class, duration etc.) of the original TXOP 601, and utilizes the one or more modified parameters of the original TXOP 601 for the transferred TXOP 603. For example, in an embodiment, the AP modifies a bandwidth of the original TXOP 601, and utilizes the modified bandwidth of the original TXOP 601 for the transferred TXOP 603. In an embodiment, in a manner described above with respect to FIG. 2, if the bandwidth of the TXOP 603 is wider than the bandwidth of the original TXOP 601, the AP transmits the data unit 614 that initiates the transferred TXOP 603 upon expiration of a relatively longer tine interval (e. g., PIFS) as compared to a relatively shorter time interval (e.g., SIFS) used if the bandwidth of the transferred TXOP 603 is the same as or narrower than the bandwidth of the original TXOP 601. As another example, as also described above with respect to FIG. 2, AP modifies access class used in the original TXOP 601, and the modified access class is used with the transferred TXOP 603, in an embodiment. For example, the AP selects any suitable access class for each station (e.g., the STA) that the AP designates as a responder in the transferred TXOP 603, in an embodiment. In another embodiment, the AP does not modify access class used in the original TXOP 601. In this embodiment, the access class used in the original TXOP 601 is used for the transferred TXOP 603.

Figure 7:
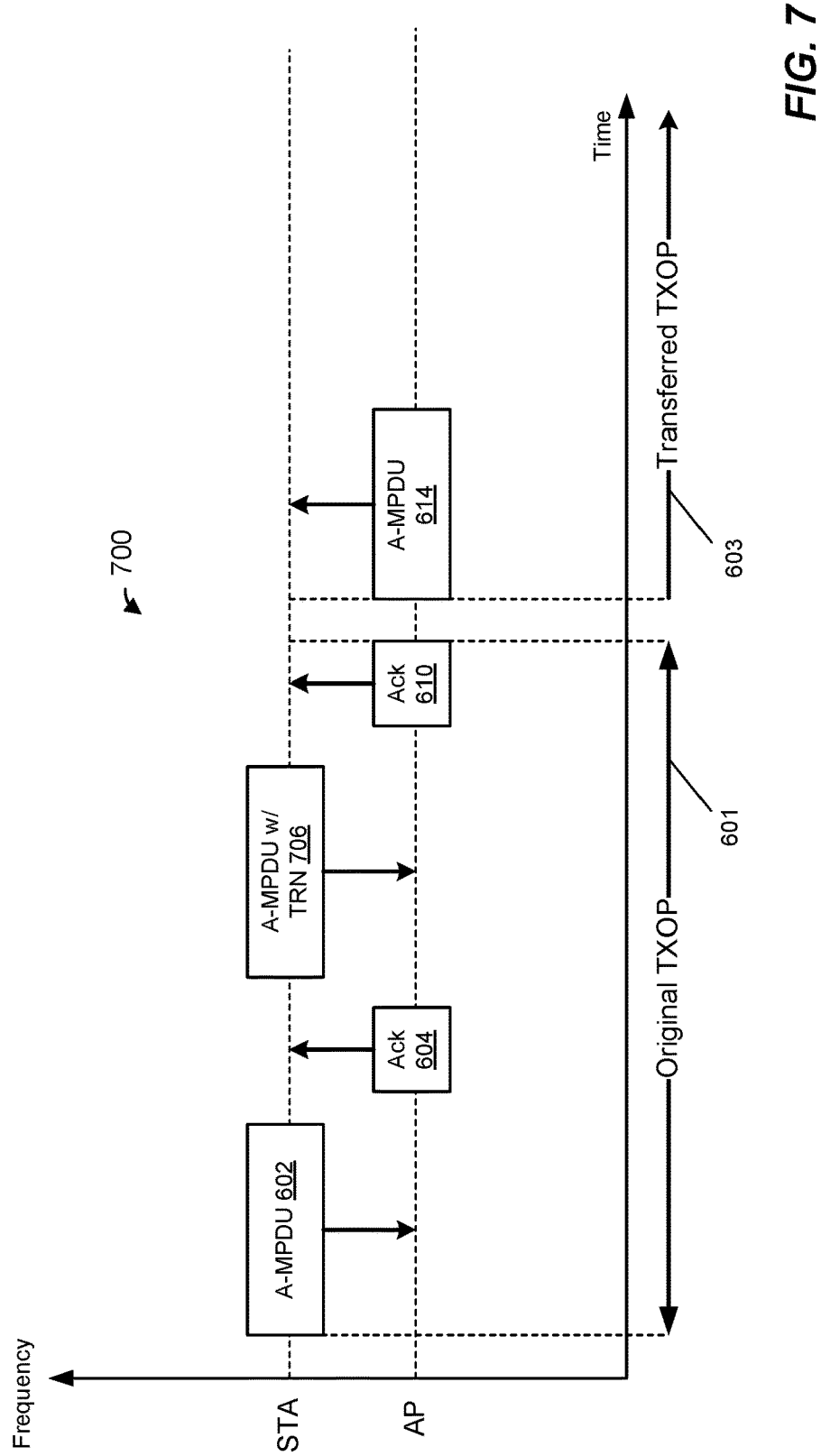
FIG. 7 is a diagram of an example transmission sequence in a WLAN, according to another embodiment.

FIG. 7 is a diagram of an example transmission sequence 700 in a WLAN, such as the WLAN 10 of FIG. 1, according to an embodiment. The transmission sequence 700 is generally the same as the transmission sequence 600 of FIG. 6, except that in the transmission sequence 700, instead of transmitting a separate TRN frame (i.e., the TRN frame 610) to notify the AP that the STA wishes to transfer TXOP to the AP, the STA includes a TRN in a second data unit 706 transmitted to the AP. For example, TRN is included in a control frame aggregated with data in the data unit 706, or is included in a MAC header of the data unit 706.

Figure 8:
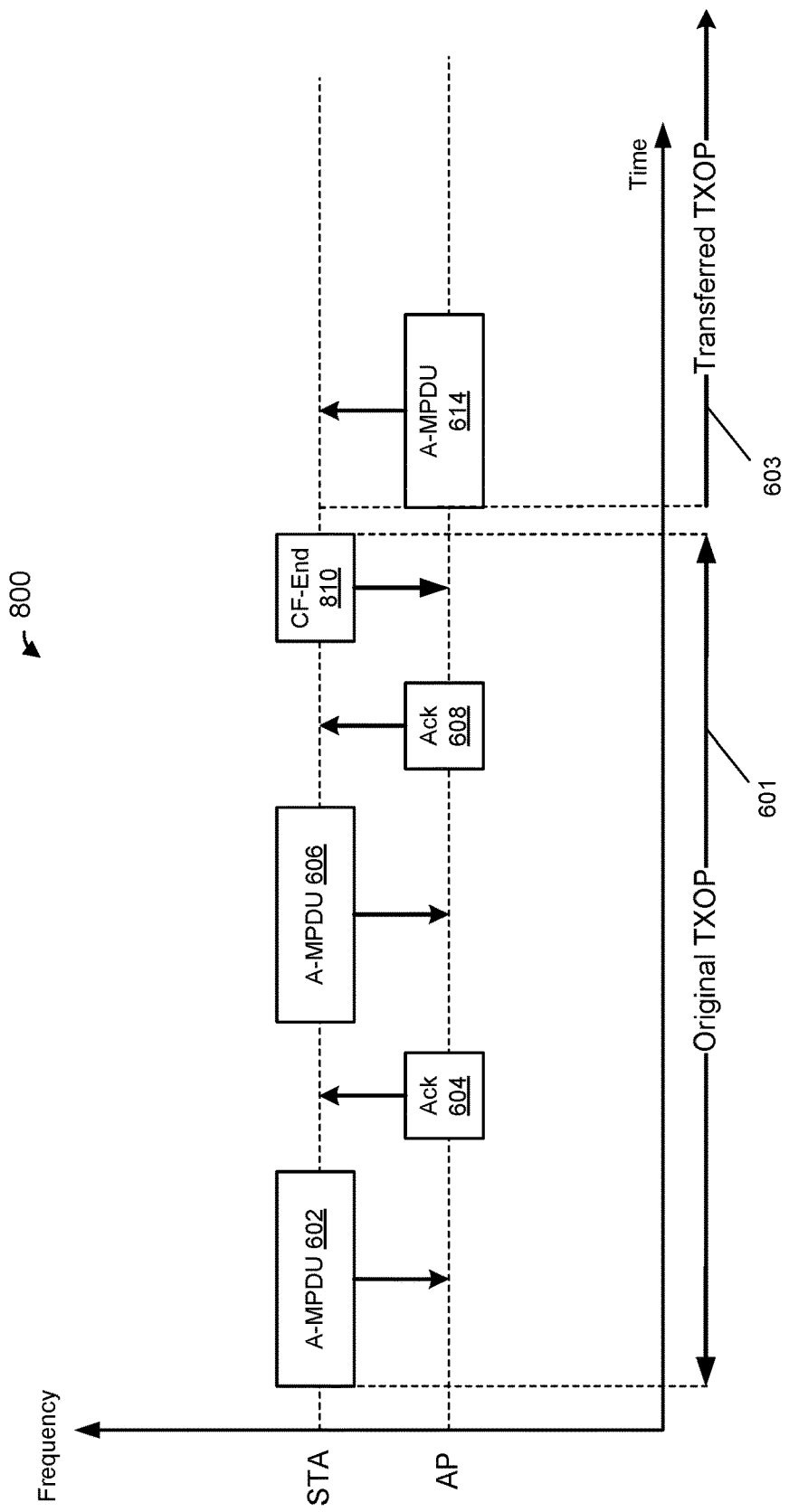
FIG. 8 is a diagram of an example transmission sequence in a WLAN, according to another embodiment.

FIG. 8 is a diagram of an example transmission sequence 800 in a WLAN, such as the WLAN 10 of FIG. 1, according to an embodiment. The transmission sequence 800 is generally the same as the transmission sequence 600 of FIG. 6, accept that in the transmission sequence 800, a contention free end (CF-end) frame, rather than a TRN frame, is used to transfer ownership of the original TXOP 601 from STA to AP, in an embodiment. In an embodiment, after receiving the acknowledgement frame 608 from the AP, STA transmits a CR-end frame 810. For example, STA transmits the CF-End frame 810 because STA reserved a duration for the original frame 601 that exceeds a required duration for the STA to transmit data to the AP, in an embodiment. The CF-End frame 810 indicates to the AP that STA has a remaining duration of the original TXOP 601 that is not needed by the STA, in an embodiment. In an embodiment, in response to receiving CF-End frame 810, the AP assumes ownership of the TXOP 601, and uses the TXOP 601 to initiate the transferred TXOP 603.

Figure 9:
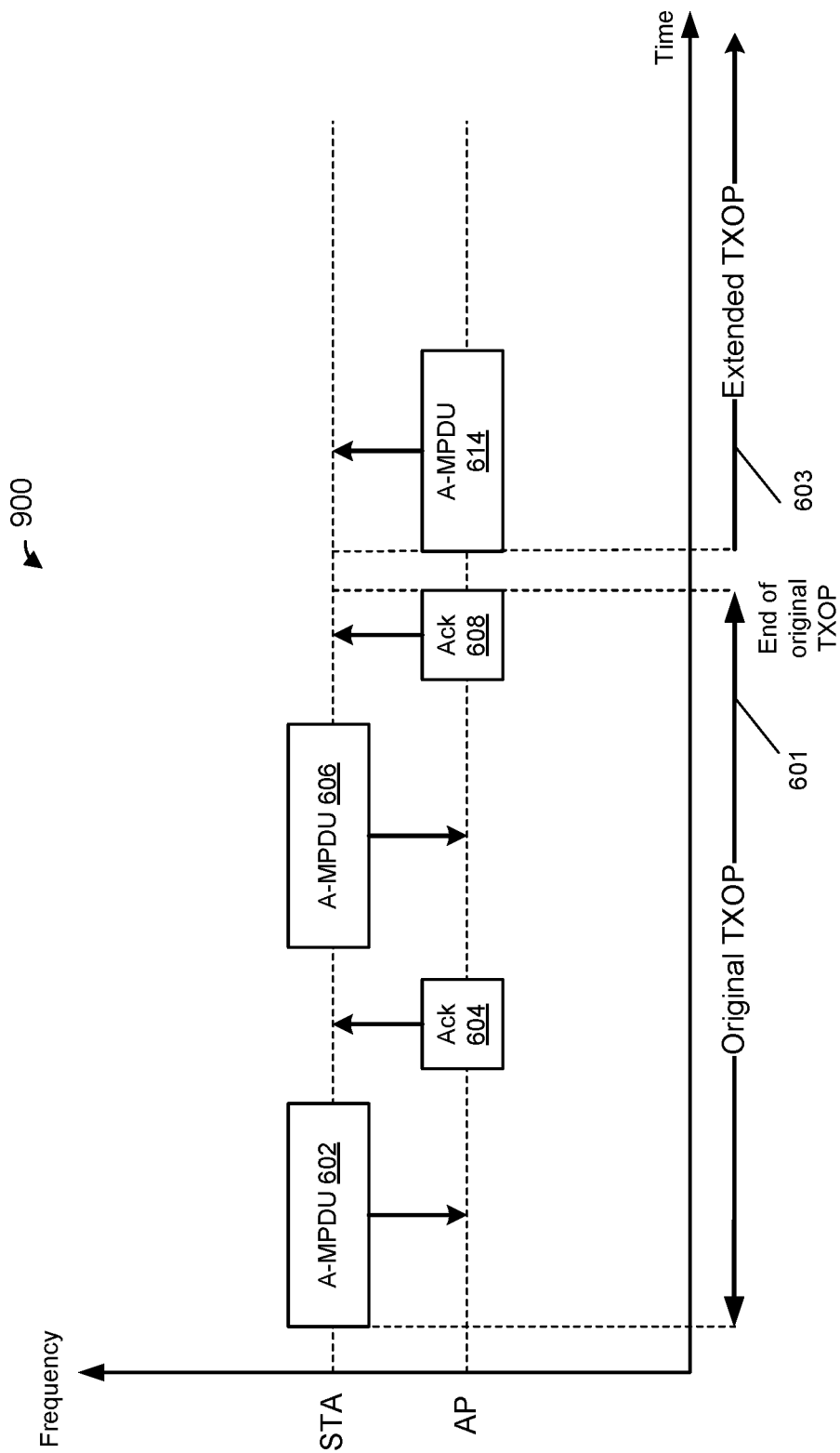
FIG. 9 is a diagram of an example transmission sequence in a WLAN, according to another embodiment.

FIG. 9 is a diagram of an example transmission sequence 900 in a WLAN, such as the WLAN 10 of FIG. 1, according to an embodiment. The transmission sequence 900 is generally the same as the transmission sequence 600 of FIG. 6, accept that in the transmission sequence 800, the AP assumes ownership of the original TXOP 601 at the end of the original TXOP 601, without receiving an explicit message from STA that STA wishes to transfer its TXOP to the AP. In an embodiment, the AP initiates the transferred TXOP 603 by transmitting the data unit 614 upon expiration of a predetermined time interval, such as a time interval corresponding to SIFS, after the end of the original TXOP 601 and without first performing backoff to acquire a TXOP, in an embodiment. In an embodiment, after receiving the acknowledgement frame 608 from the AP, STA transmits a CR-end frame 810. For example, STA transmits the CF-End frame 810 because STA reserved a duration for the original TXOP 601 that exceeds a required duration for the STA to transmit data to the AP, in an embodiment. The CF-End frame 810 indicates to the AP that STA has a remaining duration of the original TXOP 601 that is not needed by the STA, in an embodiment. In an embodiment, in response to receiving CF-End frame 810, the AP assumes ownership of the TXOP 601, and uses the TXOP 601 to initiate the transferred TXOP 603.

Figure 10:
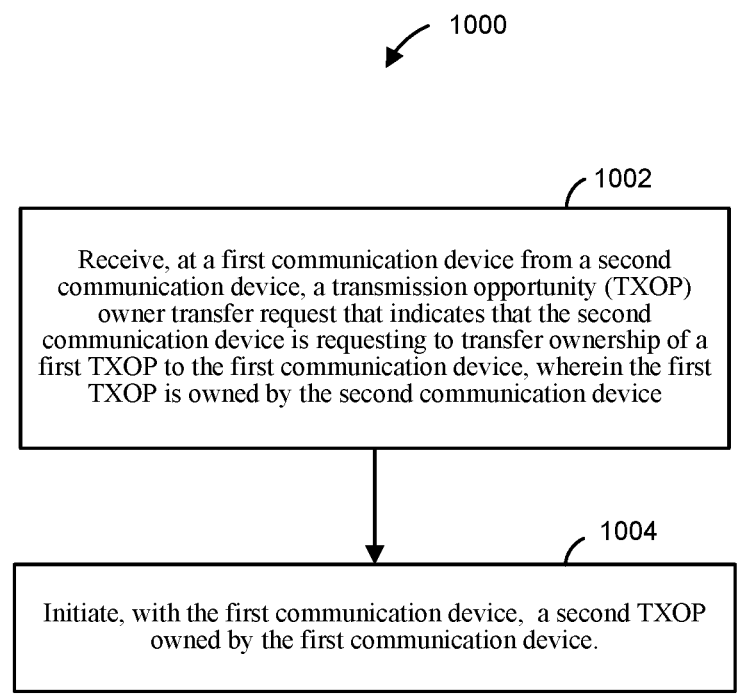
FIG. 10 is a flow diagram of an example method for using by a first communication device, a transmit opportunity (TXOP) that is transferred to the first communication from a second communication device, according to an embodiment.

FIG. 10 is a flow diagram of an example method 1000 for using by a first communication device, a TXOP that is transferred to the first communication from a second communication device, according to an embodiment. In some embodiments, the method 1000 is implemented by the AP 14 (FIG. 1). For example, in some embodiments, the network interface device 16 (e.g., the PHY processor 20 and/or the MAC processor 18) is configured to implement the method 1000. In other embodiments, another suitable network interface device is configured to implement the method 1000.

At block 1002, the first communication device receives a TXOP owner transfer request from a second communication device. The TXOP owner transfer request indicates that the second communication device is requesting to transfer ownership of a first TXOP that is owned by the second communication device to the first communication device, in an embodiment. In various embodiments, the TXOP owner transfer request is included in a control frame transmitted to the first communication device from the second communication device during the first TXOP of the second communication devices, or is included in a MAC header of a data unit to the first communication device from the second communication device during the first TXOP of the second communication devices, for example as described above with respect to FIGS. 2-9.

At block 1004, the first communication device initiates a second TXOP (e.g., a transferred TXOP) owned by the first communication device. In an embodiment, the first communication device initiates the second TXOP in response to the TXOP owner transfer request received at block 1002. In an embodiment, the first communication device utilizes the first TXOP to initiate the second TXOP. For example, because the first TXOP is transferred to the first communication device, the first communication device initiates the second TXOP without independently acquiring its own TXOP, in an embodiment. Thus, for example, the first communication device initiates the second TXOP without first performing a backoff procedure to acquire a TXOP, in an embodiment.

In an embodiment, a method includes receiving, at a first communication device from a second communication device, a transmission opportunity (TXOP) owner transfer request that indicates that the second communication device is requesting to transfer ownership of a first TXOP to the first communication device, wherein the first TXOP is owned by the second communication device. The method also includes, in response to receiving the TXOP owner transfer request, initiating a second TXOP by the first communication device, wherein the second TXOP is owned by the first communication device.

In other embodiments, the method includes any suitable combination of one or more of the following features.

Initiating the second TXOP comprises initiating the second TXOP without performing a backoff procedure.

The method further comprises, prior to initiating the second TXOP, transmitting from the first communication device to the second communication device, a TXOP owner transfer response that indicates one of (i) that the TXOP owner transfer request is accepted by the first communication device or (ii) that the TXOP owner transfer request is rejected by the first communication device.

Initiating the second TXOP comprises initiating the second TXOP only when the TXOP owner transfer response indicates that the TXOP owner transfer request is accepted by the first communication device.

The method further comprises, after transmitting the TXOP owner transfer response that indicates that the TXOP owner transfer request is rejected by the first communication device, receiving, at the first communication device, a data unit from the second communication device, wherein the data unit is transmitted using the first TXOP of the second communication device.

The method further comprises, prior to initiating the second TXOP, modifying, at the first communication device, one or more parameters of the first TXOP.

Initiating the second TXOP includes initiating the second TXOP using the one or more modified parameters of the first TXOP.

Modifying the one or more parameters of the first TXOP includes modifying a bandwidth of the first TXOP.

Modifying the bandwidth of the first TXOP comprises increasing the bandwidth of the first TXOP such that a bandwidth of the second TXOP is greater than the bandwidth of the first TXOP.

Initiating the second TXOP comprises transmitting a trigger frame from the first communication devices to a group of communication devices that includes the second communication device, wherein the trigger frame triggers simultaneous transmission from the group of communication devices to the first communication device.

The method further comprises receiving, from communication devices in the group of communication devices, respective data units that were simultaneously transmitted by the group of communication devices.

Receiving respective data unit from communication devices in the group of communication devices comprises receiving the respective data units in respective frequency portions of a communication channel.

Receiving respective data unit from communication devices in the group of communication devices comprises receiving the respective data units in respective spatial streams of a communication channel.

In another embodiment, a first communication device comprises a network interface device having one or more integrated circuits configured to receive a transmission opportunity (TXOP) owner transfer request that indicates that a second communication device is requesting to transfer ownership of a first TXOP to the first communication device, wherein the first TXOP is owned by the second communication device. The one or more integrated circuits are also configured to, in response to receiving the TXOP owner transfer request, initiate a second TXOP, wherein the second TXOP is owned by the first communication device.

In other embodiments, the first communication device comprises any suitable combination of one or more of the following features.

The one or more integrated circuits are configured to initiate the second TXOP without performing a backoff procedure.

The one or more integrated circuits are further configured to, prior to initiating the second TXOP, transmit a TXOP owner transfer response to the second communication device, wherein the TXOP owner transfer response indicates one of (i) that the TXOP owner transfer request is accepted by the first communication device or (ii) that the TXOP owner transfer request is rejected by the first communication device.

The one or more integrated circuits are configured to initiate the second TXOP only when the TXOP owner transfer response indicates that the TXOP owner transfer request is accepted by the first communication device.

The one or more integrated circuits are further configured to, after transmitting the TXOP owner transfer response that indicates that the TXOP owner transfer request is rejected by the first communication device, receive a data unit from the second communication device, wherein the data unit is transmitted using the first TXOP of the second communication device.

The one or more integrated circuits are further configured to, prior to initiating the second TXOP, modify one or more parameters of the first TXOP to generate corresponding one or more modified parameters.

The one or more integrated circuits are configured to initiate the second TXOP using the one or more modified parameters.

Modifying the one or more parameters of the first TXOP includes modifying a bandwidth of the first TXOP.

Modifying the bandwidth of the first TXOP comprises increasing the bandwidth of the first TXOP such that a bandwidth of the second TXOP is greater than the bandwidth of the first TXOP.

Initiating the second TXOP comprises transmitting a trigger frame from the first communication devices to a group of communication devices that includes the second communication device, wherein the trigger frame triggers simultaneous transmission from the group of communication devices to the first communication device.

The one or more integrated circuits are further configured to receive, from communication devices in the group of communication devices, respective data units that were simultaneously transmitted by the group of communication devices.

Receiving respective data unit from communication devices in the group of communication devices comprises receiving the respective data units in respective frequency portions of a communication channel.

Receiving respective data unit from communication devices in the group of communication devices comprises receiving the respective data units in respective spatial streams of a communication channel.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method comprising:
   receiving, at a first communication device from a second communication device, a transmission opportunity (TXOP) owner transfer request that indicates that the second communication device is requesting to transfer ownership of a first TXOP to the first communication device, wherein the first TXOP is owned by the second communication device;
   in response to receiving the TXOP owner transfer request, initiating a second TXOP by the first communication device, wherein the second TXOP is owned by the first communication device, wherein initiating the second TXOP includes modifying one or more parameters of the first TXOP in connection with initiating the second TXOP, including i) modifying a frequency bandwidth of the first TXOP, and ii) modifying a duration of the first TXOP such that the modified duration is greater than a remainder of the duration of the first TXOP; and
   using, by the first communication device, the one or more modified parameters of the first TXOP for the second TXOP, including using i) the modified frequency bandwidth, and ii) the modified duration for the second TXOP.

2. The method of claim 1, wherein initiating the second TXOP comprises initiating the second TXOP without performing a backoff procedure.

3. The method of claim 1, wherein:
   the method further comprises, prior to initiating the second TXOP, transmitting from the first communication device to the second communication device, a TXOP owner transfer response that indicates one of (i) that the TXOP owner transfer request is accepted by the first communication device or (ii) that the TXOP owner transfer request is rejected by the first communication device; and
   initiating the second TXOP comprises initiating the second TXOP only when the TXOP owner transfer response indicates that the TXOP owner transfer request is accepted by the first communication device.

4. The method of claim 3, further comprising, after transmitting the TXOP owner transfer response that indicates that the TXOP owner transfer request is rejected by the first communication device, receiving, at the first communication device, a data unit from the second communication device, wherein the data unit is transmitted using the first TXOP of the second communication device.

5. The method of claim 1, wherein modifying the one or more parameters of the first TXOP includes modifying an access class of the first TXOP, and wherein using the one or more modified parameters of the first TXOP for the second TXOP includes using the modified access class for the second TXOP.

6. The method of claim 1, wherein modifying the frequency bandwidth of the first TXOP comprises increasing the frequency bandwidth of the first TXOP such that a frequency bandwidth of the second TXOP is greater than the frequency bandwidth of the first TXOP.

7. The method of claim 1, wherein:
   initiating the second TXOP comprises transmitting a trigger frame from the first communication device to one or more communication devices in a group of communication devices that includes the second communication device, wherein the trigger frame triggers one or more transmissions from one or more communication devices in the group of communication devices to the first communication device; and
   the method further comprises receiving, from one or more communication devices in the group of communication devices, respective data units that were transmitted by one or more communication devices in the group of communication devices.

8. The method of claim 7, wherein receiving respective data unit from one or more communication devices in the group of communication devices comprises receiving the respective data units in respective frequency portions of a communication channel.

9. The method of claim 7, wherein receiving respective data unit from one or more communication devices in the group of communication devices comprises receiving the respective data units in respective spatial streams of a communication channel.

10. A first communication device, comprising:
a network interface device having one or more integrated circuits configured to:
  receive, from a second communication device, a transmission opportunity (TXOP) owner transfer request that indicates that the second communication device is requesting to transfer ownership of a first TXOP to the first communication device, wherein the first TXOP is owned by the second communication device,
  in response to receiving the TXOP owner transfer request, initiate a second TXOP, wherein the second TXOP is owned by the first communication device, wherein initiating the second TXOP includes modifying one or more parameters of the first TXOP in connection with initiating the second TXOP, including i) modifying a frequency bandwidth of the first TXOP, and ii) modifying a duration of the first TXOP such that the modified duration is greater than a remainder of the duration of the first TXOP, and
  use the one or more modified parameters of the first TXOP for the second TXOP, including using i) the modified frequency bandwidth, and ii) the modified duration for the second TXOP.

11. The first communication device of claim 10, wherein the one or more integrated circuits are configured to initiate the second TXOP without performing a backoff procedure.

12. The first communication device of claim 10, wherein the one or more integrated circuits are further configured to:
  prior to initiating the second TXOP, transmit a TXOP owner transfer response to the second communication device, wherein the TXOP owner transfer response indicates one of (i) that the TXOP owner transfer request is accepted by the first communication device or (ii) that the TXOP owner transfer request is rejected by the first communication device; and
  initiate the second TXOP only when the TXOP owner transfer response indicates that the TXOP owner transfer request is accepted by the first communication device.

13. The first communication device of claim 12, wherein the one or more integrated circuits are further configured to, after transmitting the TXOP owner transfer response that indicates that the TXOP owner transfer request is rejected by the first communication device, receive a data unit from the second communication device, wherein the data unit is transmitted using the first TXOP of the second communication device.

14. The first communication device of claim 10, wherein the one or more integrated circuits are further configured to:
  modify an access class of the first TXOP; and
  use the modified access class for the second TXOP.

15. The first communication device of claim 10, wherein modifying the frequency bandwidth of the first TXOP comprises increasing the frequency bandwidth of the first TXOP such that a frequency bandwidth of the second TXOP is greater than the frequency bandwidth of the first TXOP.

16. The first communication device of claim 10, wherein:
  initiating the second TXOP comprises transmitting a trigger frame from the first communication device to one or more communication devices in a group of communication devices that includes the second communication device, wherein the trigger frame triggers one or more transmissions from one or more communication devices in the group of communication devices to the first communication device; and
  the one or more integrated circuits are further configured to receive, from one or more communication devices in the group of communication devices, respective data units that were transmitted by one or more communication devices in the group of communication devices.

17. The first communication device of claim 16, wherein receiving respective data units from one or more communication devices in the group of communication devices comprises receiving the respective data units in respective frequency portions of a communication channel.

18. The first communication device of claim 16, wherein receiving respective data units from one or more communication devices in the group of communication devices comprises receiving the respective data units in respective spatial streams of a communication channel.

* * * * *